US012734591B2

(12) United States Patent
Nakamoto et al.

(10) Patent No.: US 12,734,591 B2
(45) Date of Patent: Sep. 15, 2026

(54) DRILL AND METHOD OF PRODUCING DRILLED PRODUCT

(71) Applicant: SUBARU CORPORATION, Tokyo (JP)

(72) Inventors: Rei Nakamoto, Tokyo (JP); Tsukasa Yokono, Tokyo (JP); Aoi Mase, Tokyo (JP); Shunsuke Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 338 days.

(21) Appl. No.: 18/429,692

(22) Filed: Feb. 1, 2024

(65) Prior Publication Data

US 2024/0253132 A1 Aug. 1, 2024

(30) Foreign Application Priority Data

Feb. 1, 2023 (JP) ................................ 2023-013817

(51) Int. Cl.
*B23B 51/02* (2006.01)
*B23B 51/06* (2006.01)

(52) U.S. Cl.
CPC .......... *B23B 51/02* (2013.01); *B23B 51/0684* (2022.01); *B23B 2251/048* (2022.01)

(58) Field of Classification Search
None
See application file for complete search history.

(56) References Cited

U.S. PATENT DOCUMENTS 9,511,424 B2 * 12/2016 Takai ...................... B23B 51/02
10,399,153 B2 * 9/2019 Matsuo .................. B23B 51/06

FOREIGN PATENT DOCUMENTS

JP H10-080809 A 3/1998
JP 2001-341022 A 12/2001
JP 2002172506 A * 6/2002
JP 2002-326109 A 11/2002
JP 3119919 U 3/2006
JP 2008296327 A * 12/2008
JP 2014037008 A * 2/2014
JP 2014193513 A * 10/2014
JP 6011849 B2 * 10/2016
WO WO-2013099841 A1 * 7/2013 ........... B23B 51/009
WO WO-2016047803 A1 * 3/2016 ............ B23B 51/00

OTHER PUBLICATIONS

Translation of JP-6011849-B2 (Year: 2016).*
Translation of JP-2002172506-A (Year: 2002).*
Extended European Search Report issued Jun. 18, 2024 in European Patent Application No. 24153347.0, citing document 15 therein, 8 pages.

* cited by examiner

*Primary Examiner* — Jacob J Cigna

(74) *Attorney, Agent, or Firm* — Finnegan, Henderson, Farabow, Garrett & Dunner, LLP

(57) ABSTRACT

A drill has two to four cutting edges each made of cemented carbide or polycrystalline diamond. Helical flutes are formed alternately with the cutting edges. X-shaped thinning has been applied to the cutting edges. A rake angle of the cutting edges is not less than 30 degrees and not more than 40 degrees. A clearance angle of the cutting edges is more than 0 degrees and not more than 8 degrees. The cutting edges each has a honed face by chamfer honing. A honing angle of the honed face is not less than −3 degrees and not more than 8 degrees.

20 Claims, 6 Drawing Sheets

RESULTS OF MANUAL DRILLING TEST OF TITANIUM ALLOY

| THINNING | RAKE ANGLE | CLEARANCE ANGLE | HONING ANGLE | VIBRATION CUTTING | HOLE QUALITY | CUTTING RESISTANCE | CHIP DISCHARGE | OVERALL EVALUATION |
|---|---|---|---|---|---|---|---|---|
| R | 30° | 16° | -3° | 5/0.15 | POOR | HIGH | POOR | POOR |
| R | 40° | 12° | -8° | 5/0.20 | | | | POOR |
| R | 20° | 8° | 8° | 5/0.25 | | | | POOR |
| XR | 40° | 16° | 8° | 5/0.15 | | | | POOR |
| XR | 30° | 12° | -8° | 5/0.25 | | | | MEDIUM |
| XR | 20° | 8° | -3° | 5/0.20 | | | | MEDIUM |
| X | 40° | 16° | -8° | 5/0.25 | | | | MEDIUM |
| X | 20° | 12° | 8° | 5/0.15 | | | | GOOD |
| X | 30° | 8° | -3° | 5/0.20 | GOOD | LOW | GOOD | BEST |

FIG. 5

RESULTS OF MANUAL DRILLING TEST OF TITANIUM ALLOY

| THINNING | X | XR | R |
|---|---|---|---|
| | GOOD | MEDIUM | POOR |
| RAKE ANGLE | 20° | 30° | 40° |
| | MEDIUM | GOOD | GOOD |
| CLEARANCE ANGLE | 0°-8° | 12° | 16° |
| | GOOD | MEDIUM | POOR |
| HONING ANGLE | -8° | -3° | 8° |
| | POOR | GOOD | GOOD |
| VIBRATION CUTTING (5 TIMES/ROUND) | AMPLITUDE 0.15 mm | AMPLITUDE 0.20 mm | AMPLITUDE 0.25mm |
| | MEDIUM | GOOD | GOOD |

FIG. 6

DRILL AND METHOD OF PRODUCING DRILLED PRODUCT

CROSS REFERENCES TO RELATED APPLICATIONS

This application is based upon and claims the benefit of priority from Japanese Patent Application No. 2023-013817, filed on Feb. 1, 2023; the entire contents of which are incorporated herein by reference.

BACKGROUND OF THE INVENTION

Field of the Invention

Embodiments described herein relate generally to a drill and a method of producing a drilled product.

Description of Background Art

Japanese Patent Application Publication JP2002-326109 A and Japanese Patent Application Publication JP2002-172506 A describe a drill having cutting edges whose tips are honed. Japanese Patent Application Publication JP2001-341022 A describes thinning performed at the center of the distal portion of the cutting edges of a drill. Japanese Utility model registration JP3119919U describes that the shape of each cutting edge of a drill is selected according to a material of the drill, a material of a workpiece and the like. Japanese Patent Application Publication JPH10-080809 A describes a drill driving condition. The entire contents of these publications are incorporated herein by reference.

SUMMARY OF THE INVENTION

According to one aspect of the present invention, a drill includes a body having two to four cutting edges each including cemented carbide or polycrystalline diamond such that helical flutes are formed alternately with the cutting edges. X-shaped thinning has been applied to the cutting edges, a rake angle of the cutting edges is not less than 30 degrees and not more than 40 degrees, a clearance angle of the cutting edges is more than 0 degrees and not more than 8 degrees, and each of the cutting edges has a honed face by chamfer honing such that a honing angle of the honed face is not less than −3 degrees and not more than 8 degrees.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a table showing results of drilling tests on a titanium alloy lined in order of overall evaluation;

FIG. 6 is a table showing the results of the drilling tests shown in FIG. 5 according to cutting conditions.

DETAILED DESCRIPTION OF THE EMBODIMENTS

Figure 1:
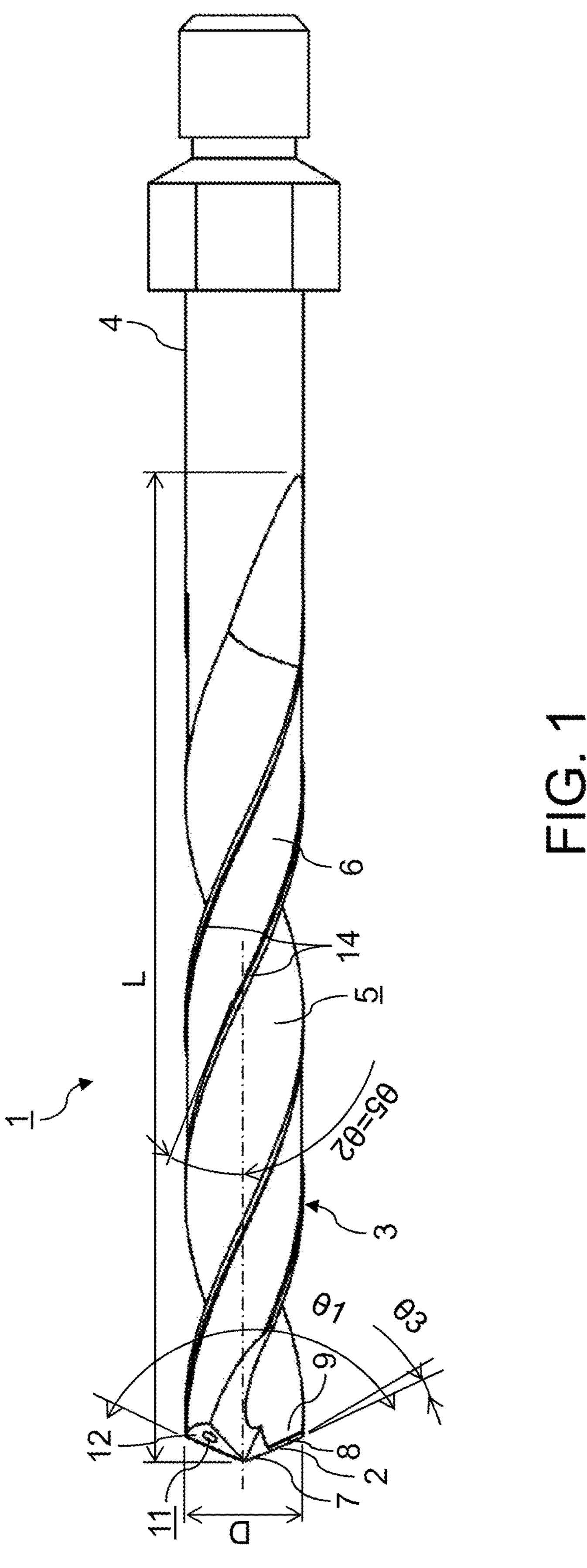
FIG. 1 is a front view of a drill according to an embodiment of the present invention.

Embodiments will now be described with reference to the accompanying drawings, wherein like reference numerals designate corresponding or identical elements throughout the various drawings.

A drill and a method of producing a drilled product according to embodiments of the present invention will be described with reference to the accompanying drawings.

Figure 2:
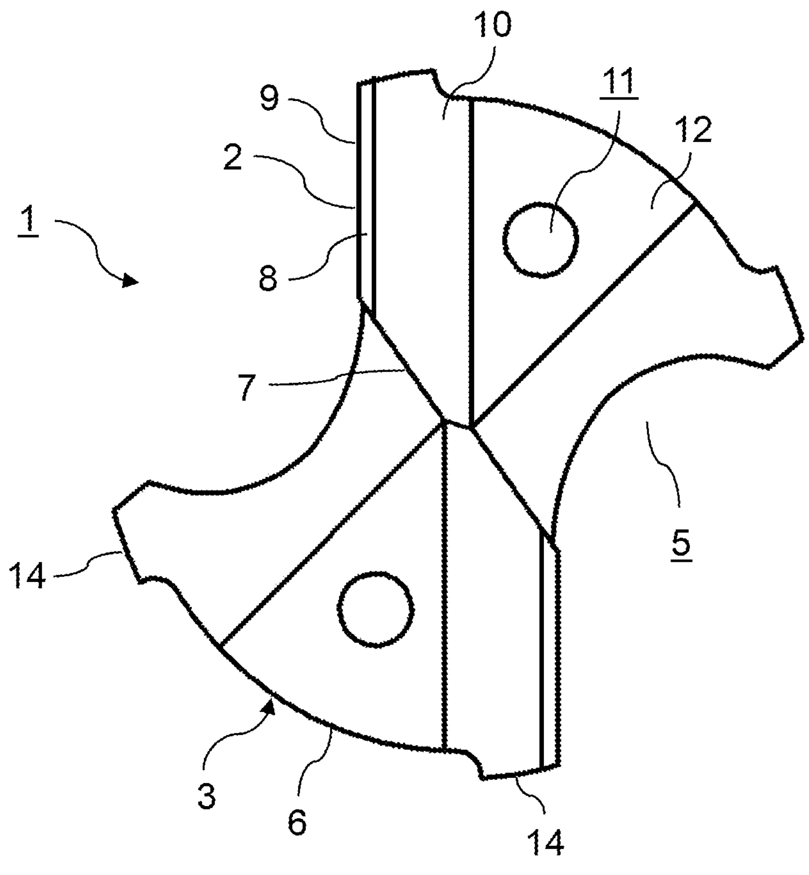
FIG. 2 is an enlarged left side view of the drill shown in FIG. 1.
Figure 3:
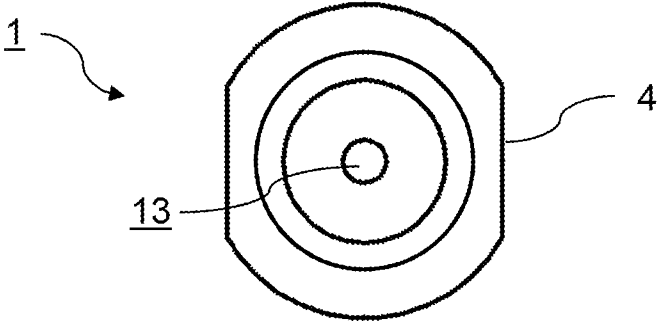
FIG. 3 is an enlarged right side view of the drill shown in FIG. 1.

FIG. 1 is a front view of a drill 1 according to an embodiment of the present invention. FIG. 2 is an enlarged left side view of the drill 1 shown in FIG. 1. FIG. 3 is an enlarged right side view of the drill 1 shown in FIG. 1.

The drill 1 is a twist drill having cutting edges 2 whose number is two to four. The drill 1 has a body 3 and a shank 4. The cutting edges 2 are formed at the tip portion of the body 3. The body 3 also has helical flutes 5 and fluted lands 6 whose numbers are each equal to the number of the cutting edges 2.

The drill 1 has a shape suitable for drilling a titanium alloy by attaching the drill 1 to a hand-held tool rotating device for rotating the drill 1, in particular, a tool driving device having an automatic feed function that can not only rotate the drill 1 but also reciprocate the drill 1 in the tool axis direction. Therefore, the shape of the shank 4 can be made into a desired shape for attachment and detachment to a tool driving device.

In the illustrated example, the drill 1 is a two-flute solid drill of which the body 3 and part of the shank 4 are integrally made of a single material. As a matter of course, the drill 1 may be a three-flute drill or a four-flute drill as mentioned above. The reason why the drill 1 is designed to have not more than four edges is that the helical flutes may become clogged with chips in case of drilling a titanium alloy with a drill having more than four edges.

The drill 1 may not be a solid drill but be a tipped drill, an indexable insert drill, a modular drill, or the like. In case of a tipped drill which is also called a brazed drill, the cutting edges 2 are brazed to the body 3. In case of an indexable insert drill which is also called an insert drill or a throw-away drill, the replaceable cutting edges 2 which are called inserts or throw-away tips are mounted on the body 3 serving as a holder for the cutting edges 2. In case of a modular drill, a replaceable head having the cutting edges 2 is mounted on the body 3 serving as a holder.

Since a target to be drilled is a titanium alloy, it is realistic to make at least each cutting edge 2 of cemented carbide or poly-crystalline diamond (PCD). As a matter of course, when each cutting edge 2 is made of cemented carbide, the cemented carbide may be a base material to which desired coating, such as diamond coating, is applied. When each cutting edge 2 is made of PCD, it is practical to braze the cutting edges 2 to seating faces of the body 3 made of cemented carbide. On the other hand, when the drill 1 is an indexable insert drill or a modular drill, the holder may be made of high speed steel while each cutting edge 2 or a head is made of cemented carbide.

Next, the detailed shape of the cutting edge 2 will be described.

The point angle $\theta 1$ of the cutting edges 2 shown in FIG. 1 can be determined to be an angle suitable for a material of the cutting edges 2. When the drill 1 is a cemented carbide drill, the point angle θ1 of the cutting edges 2 can be determined within a range of not less than 130 degrees and not more than 150 degrees.

In addition, X-type thinning is applied to the cutting edges 2, as shown in FIG. 2. Therefore, straight thinning edges 7 are formed at the chisel edge portion near the center of the cutting edges 2. Further, a honed face 8 by chamfer honing is formed on the tip of each cutting edge 2.

Figure 4:
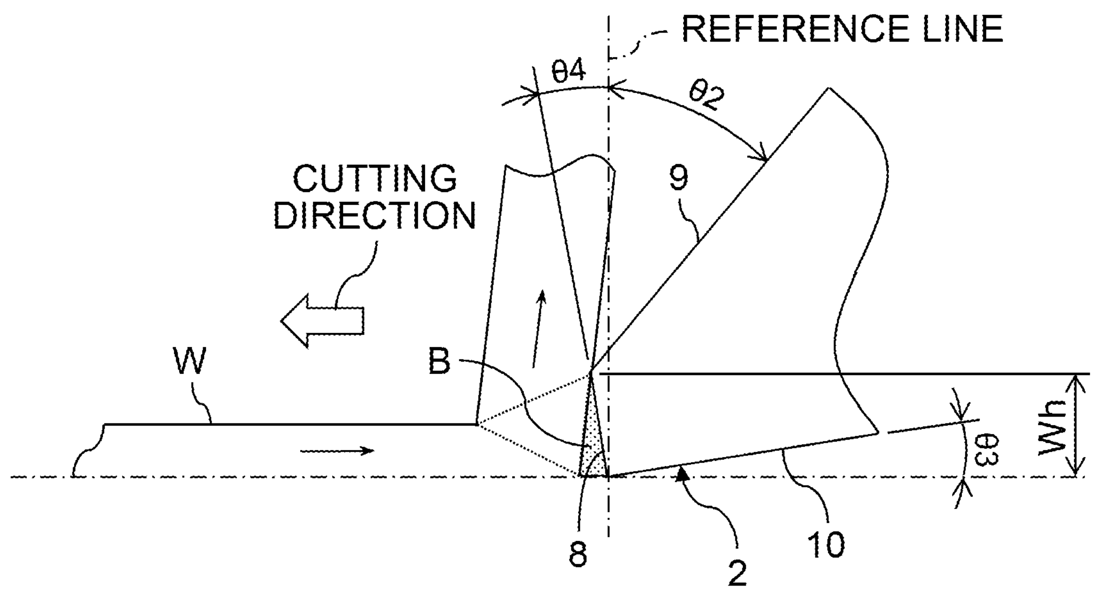
FIG. 4 shows the rake angle, clearance angle, and honing angle of the cutting edges of the drill shown in FIG. 1 together with a workpiece.

FIG. 4 shows the rake angle θ2, clearance angle θ3, and honing angle θ4 of the cutting edges 2 of the drill 1 shown in FIG. 1 together with a workpiece W.

The rake angle θ2 of a rake face 9 of each cutting edge 2 shown in FIG. 4 and the like is not less than 30 degrees and not more than 40 degrees (30°≤θ2≤40°). The clearance angle θ3 of a flank face 10 of each cutting edge 2 is more than 0 degrees and not more than 8 degrees (0°<θ3≤8°). The honing angle θ4 of the honed face 8 of each cutting edge 2 is not less than −3 degrees and not more than 8 degrees (−3°≤θ4≤8°). The width Wh of the honed face 8 can be determined within a range of not less than 0.05 mm and not more than 0.5 mm (0.05 mm≤Wh≤0.5 mm). Note that, the rake angle θ2 at the outer circumferential portion of each cutting edge 2 is equal to the helix angle θ5 representing the degree of the helix of each helical flute 5 shown in FIG. 1.

Similarly to the rake angle, the honing angle of a cutting edge of a drill is defined as an angle by which a honed face slants clockwise, in a plane perpendicular to the length direction of the cutting edge as shown in FIG. 4, relative to the projection line of the tool axis. Generally, a honed face of a cutting edge of a drill having a negative honing angle is also called a negative land, and the honing angle of a negative land is also called a land angle.

Although FIG. 4 shows a case where the honing angle θ4 of the honed face 8 formed at the tip of each cutting edge 2 is a negative angle (−3°≤θ4<0°), i.e., a case where a negative land is formed at the tip of each cutting edge 2 by chamfering, the honing angle θ4 of the honed face 8 may be 0 degrees or a positive angle (0°≤θ4≤8°). When the honing angle θ4 of the honed face 8 is 0 degrees (θ4=0°), a land that is neither negative nor positive is formed at the tip of each cutting edge 2. On the other hand, when the honing angle θ4 of the honed face 8 is a positive angle (0°<θ4≤8°), a positive land is formed at the tip of each cutting edge 2.

When the honing angle θ4 of the honed face 8 is a negative angle, the workpiece W is cut so as to be ripped off by the honed face 8 of each cutting edge 2, as shown in FIG. 4. Conversely, when the honing angle θ4 of the honed face 8 is a positive angle, the workpiece W is cut so as to be scooped up by the honed face 8 of each cutting edge 2.

It was confirmed by drilling tests that drilling a titanium alloy under appropriate drilling conditions using the drill 1 having the cutting edges 2 satisfying the above-mentioned conditions allowed reducing cutting resistance while ensuring desirable quality of holes formed in the titanium alloy by the drilling even in case of using a hand-held tool rotating device or a hand-held tool driving device with an automatic feed function for drilling the titanium alloy.

FIG. 5 is a table showing results of drilling tests on a titanium alloy lined in order of overall evaluation. FIG. 6 is a table showing the results of the drilling tests shown in FIG. 5 according to cutting conditions.

As shown in FIG. 5 and FIG. 6, trial drills having different thinning shapes, rake angles, clearance angles and honing angles were made, and drilling tests were conducted to drill through holes in blocks made of a titanium alloy. In the drilling tests, vibration cutting was performed with changing the vibration amplitude as a condition for controlling the drills by a tool driving device.

An evaluation was comprehensively performed based on multiple evaluation items. More specifically, the evaluation items were whether the hole quality was good, whether the cutting resistance was reduced, and whether the chip discharge performance was good, as shown in FIG. 5. The hole quality was further comprehensively evaluated on multiple items including degree of burrs generated by drilling, variation in diameter of drilled holes, and surface roughness of inner surfaces of drilled holes.

As results of the drilling tests, it was confirmed that X-shaped thinning allowed reducing the cutting resistance while improving both quality of drilled holes and chip discharge performance as shown in FIG. 5 and FIG. 6. On the other hand, it was confirmed that R-shaped thinning and XR-shaped thinning increased the cutting resistance, which might cause chipping of a cutting edge or insufficient quality of drilled holes. Therefore, it is appropriate to apply X-shaped thinning to the cutting edges 2 as shown in FIG. 2, based on the evaluation results shown in FIG. 6.

Note that, X-shaped thinning forms thinning edges whose ridgelines are linear while R-shaped thinning forms thinning edges whose ridgelines are curved. XR-shaped thinning is often adopted for a cemented carbide drill having high hardness but low toughness. XR-shaped thinning is thinning in which only coupling portions of the thinning edges and the cutting edges are locally R-shaped so that acute angle portions where chipping is likely to arise may not be generated on the ridgelines of the thinning edges and the cutting edges.

Regarding the rake angle, it was confirmed that the rake angle of not more than 20 degrees increased the cutting resistance, which might cause chipping of a cutting edge or insufficient quality of drilled holes. Therefore, it is appropriate to set the rake angle θ2 of the cutting edges 2 to not less than 30 degrees and not more than 40 degrees as shown in FIG. 6.

Regarding the clearance angle, it was confirmed that the clearance angle exceeding 8 degrees caused insufficient rigidity of the cutting edges, which might cause chipping of a cutting edge or insufficient quality of drilled holes. Further, the smaller the clearance angle was, the more quality of drilled holes improved. Therefore, it is appropriate to set the clearance angle θ3 of the cutting edges 2 to more than 0 degrees and not more than 8 degrees as shown in FIG. 6 so that the flank face 10 may not come into contact with the workpiece W.

Regarding the honing angle, it was confirmed that setting the honing angle to a non-negative angle of not less than 0 degrees and not more than 8 degrees allowed improving both the chip discharge performance and quality of drilled holes since the cutting edges became sharp and thereby the cutting resistance was reduced. Conversely, it was also confirmed that setting the honing angle to a negative angle of not less than −3 degrees and less than 0 degrees allowed improving both the chip discharge performance and quality of drilled holes since a built-up cutting edge (dead metal) B was formed due to welding of chips on the honed face 8 as shown in the shaded area in FIG. 4 and thereby the cutting resistance was reduced. Therefore, it is appropriate to set the honing angle θ4 of the cutting edges 2 to not less than −3 degrees and not more than 8 degrees as shown in FIG. 6.

The vibration cutting was performed by reciprocating each drill in the tool axis direction five times per rotation of the drill, with varying the amplitude. The amplitude was set at 0.15 mm, 0.20 mm and 0.25 mm. As a result, it was found that it was desirable to set the amplitude to not less than 0.20 mm as shown in FIG. 6 in order to improve the chip discharge performance. It is thought that the chip discharge performance does not deteriorate unless the amplitude or the number of reciprocations of a drill per rotation is reduced. Therefore, when vibration cutting is performed, it is considered desirable to reciprocate the drill 1 in the tool axis direction at least five times per rotation with amplitude of not less than 0.20 mm.

In addition to the drilling conditions mentioned above, it was confirmed that the feed per tooth of the drill 1 could be increased up to not less than 0.05 mm in drilling of a titanium alloy by setting the rotation speed of the drill 1, which is another drilling condition set in a hand-held tool driving device, to not less than 400 rpm and not more than 700 rpm. That is, it was confirmed that a titanium alloy could be drilled at a higher speed with a sufficient cutting amount.

As for another cutting condition based on the drilling tests, it is considered desirable to discharge cutting fluid from the drill 1 at a discharge rate of not less than 10 ml/m during drilling of a titanium alloy from the viewpoint of keeping lubricity and cooling. In particular, in case of cutting a titanium alloy, it is important to cool the workpiece W and the cutting edges 2 in addition to ensuring lubricity since the cutting heat increases. It is said that a water-soluble cutting fluid is suitable as a type of the cutting fluid when cooling performance is important although the cutting fluid may be oil-based or water-soluble.

When cutting fluid is discharged from the drill 1, at least one discharge port 11 is formed for discharging the cutting fluid toward the workpiece W, at the tip portion of the drill 1, as illustrated in FIG. 2. When the flank face 10 of the cutting edge 2 is flat as in the example shown in FIG. 2, a secondary flank face 12 is generally formed adjacently to the flank face 10, having the clearance angle θ3, on the cutting edge 2 side. Therefore, it is practical to open the discharge port 11, for discharging cutting fluid toward the workpiece W, at the secondary flank face 12 formed on each cutting edge 2, as illustrated in FIG. 2.

Figure 7:
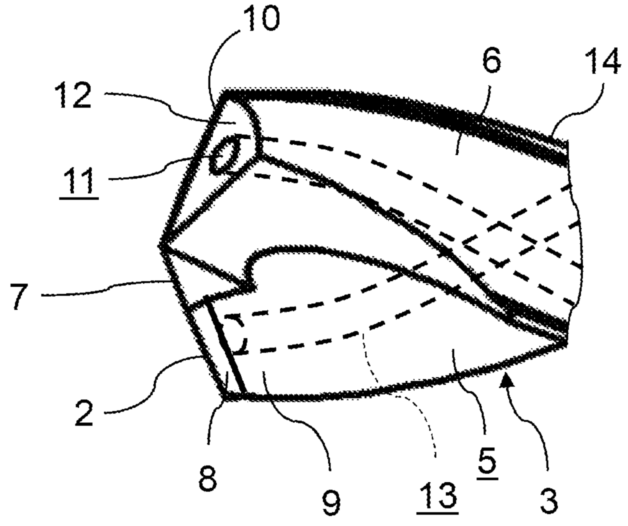
FIG. 7 is a partial front view of a distal portion of the drill shown in FIG. 1 showing an example of forming flow paths, for cutting fluid, which open at the distal portion of the drill.

FIG. 7 is a partial front view of a distal portion of the drill 1 shown in FIG. 1 showing an example of forming flow paths 13, for cutting fluid, which open at the distal portion of the drill 1.

In case of discharging cutting fluid from the drill 1 during drilling, at least one flow path 13 is formed for the cutting fluid inside the drill 1. The discharge port 11 opened at the tip portion of the drill 1 is used as an outlet of the flow path 13. In addition, at least one inlet of the flow path 13 or the flow paths 13 is opened at an appropriate position on the shank 4 side so that cutting fluid can be supplied from the tool driving device side. For example, a single inlet of the flow path 13 or the flow paths 13 can be opened at the rear end face of the shank 4 as shown in FIG. 3. As a matter of course, at least one inlet of the flow path 13 or the flow paths 13 may be opened on the side surface of the shank 4 depending on structure of the tool driving device.

It is desirable to form the discharge port 11, which is the outlet of the flow path 13, on the secondary flank face 12 of each cutting edge 2 so that each cutting edge 2 can be cooled. Therefore, the number of the discharge ports 11 is the same as the number of the cutting edges 2. Accordingly, the single flow path 13 on the inlet side formed inside the shank 4 can be branched at a desired position to form the flow paths 13 inside the fluted lands 6 respectively as shown in FIG. 7. In this case, the flow rate of cutting fluid discharged toward the workpiece W from the discharge ports 11 of the drill 1 is a flow rate of the cutting fluid supplied from the tool driving device side into the drill 1.

Another preferred feature of the drill 1 illustrated in FIG. 1 is that the drill 1 is a double margin drill having two margins 14 on each fluted land 6 formed between the helical flutes 5. The margins 14 are formed of cylindrical surfaces, each having a tool diameter, along both edges of the fluted land 6, and each functions as a guide using a drilled hole. Therefore, forming the two margins 14 on each fluted land 6 allows improving the effect of suppressing wobbling of the drill 1 during drilling. Accordingly, even in case of drilling deep holes in a titanium alloy, the accuracy of the drilled holes can be secured satisfactorily.

Drilling with a drill whose cutting edge length L, which is generally defined as a flute length of helical flutes, is longer than five times the tool diameter D, i.e., a drill having the relationship L>5D is called deep hole drilling in many cases. The cutting edge length L of the drill 1 shown in FIG. 1, which is defined as a flute length of the helical flutes 5, is more than 10 times the tool diameter D, which is longer than 5 times the tool diameter D. Therefore, the drill 1 shown in FIG. 1 is a drill for deep holes according to the above-mentioned definition.

Accordingly, in case of deep hole drilling of a titanium alloy with the drill 1 having the cutting edge length L which is long compared to the tool diameter D, as illustrated in FIG. 1, it is desirable that the drill 1 is a double margin drill, from the viewpoint of ensuring quality of drilled holes. In other words, when the drill 1 whose cutting edges 2 have the above-mentioned shapes is a double margin drill, the feed per tooth can be increased while ensuring quality of drilled holes even in case of the long cutting edge length L. For example, the feed per tooth can be set to not less than 0.05 mm. That is, it becomes possible to complete drilling at a higher speed in case of deep hole drilling of a titanium alloy.

A drilled product can be produced by drilling a part made of a titanium alloy with the drill 1 having the above-mentioned features. That is, it is possible to produce a drilled product made of a titanium alloy having at least one improved quality hole.

In the above-mentioned drill 1 and method of producing a drilled product, drilling conditions including the shape of the cutting edges 2 are determined based on results of drilling tests under special drilling conditions of manual drilling of a titanium alloy, which is a difficult-to-cut material, by an operator.

Therefore, according to the drill 1 and the method of producing a drilled product, the drilling time can be made shorter than heretofore while securing quality of drilled holes and the safety of an operator in case of drilling a titanium alloy. That is, since the cutting resistance during drilling of a titanium alloy can be reduced, the feed per tooth can be increased more than heretofore.

Specifically, according to results of drilling tests, it was confirmed that the cutting resistance could be reduced by about 10% compared to that by a conventional drill. As a result, it was confirmed that the time required to drill a titanium alloy could be reduced by 40% or more compared to that in case of using a conventional drill for drilling the titanium alloy.

Other Embodiments

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

A typical drill has cutting edges each having a rake face and a flank face. A drill may have cutting edges whose tips are honed (for example, refer to Japanese Patent Application Publication JP2002-326109 A and Japanese Patent Application Publication JP2002-172506 A). Honing is a process that grinds the tip of a cutting edge. A face called a negative land is formed at the tip of a cutting edge as a rake face having a negative angle by honing.

Honing of cutting edges of a drill to form negative lands respectively allows improving the rigidity at the tip of each cutting edge although cutting resistance increases. As a result, in case of drilling a hard workpiece, the cutting edges can be prevented from chipping. A drill made of a material whose toughness is low, such as a cemented carbide drill, has negative lands in many cases. Honing includes chamfer honing, which forms a chamfer, and R honing, which forms a rounded corner. The general honing angle (land angle) of a negative land formed by chamfer honing is about −15 degrees to −30 degrees while the general honing width (land width) is about 0.01 mm to 0.25 mm.

In addition, thinning may be performed at the center of the distal portion of the cutting edges of a drill as necessary, primarily to reduce cutting resistance in the thrust direction (for example, refer to Japanese Patent Application Publication JP2001-341022 A). Thinning is a process for reducing the thickness of the web at the tip of a drill, i.e., the core thickness to form edges up to the tip of the cutting edges. Each edge formed by thinning is called a thinning edge. Thinning has various types which are classified into an X-type, an R-type, an XR-type and the like depending on the shape of a chisel edge after thinning.

The shape of each cutting edge of a drill, which is determined by various parameters including the above-mentioned rake angle of the rake face and relief angle of the flank face, is selected according to a material of the drill, a material of a workpiece and the like (for example, refer to Japanese Utility model registration JP3119919U). In addition, the rotational speed of the drill and the feed per tooth are also determined as cutting conditions according to a material of the drill, a material of a workpiece and the like. Vibration cutting, in which cutting is performed while vibrating a drill in the direction of the tool axis, is also known as a drill driving condition (for example, refer to Japanese Patent Application Publication JPH10-080809 A).

In case of assembling aircraft parts to produce an aircraft structure, such as a wing structure, drilling work is required to couple the aircraft parts with each other using rivets or bolts. However, an aircraft structure is generally complex, and therefore it is difficult to automate drilling using a robot or the like in many cases. In such a case, an operator is forced to perform drilling operation using a hand-held tool rotating device with a drill attached. In recent years, a tool driving device having an automatic feed function that can feed a drill in the tool axis direction has also been commercially available.

However, a titanium alloy, which is used as a material for an aircraft part, is a typical difficult-to-cut material. In case of drilling a titanium alloy, cutting resistance becomes extremely large. Accordingly, when a titanium alloy is tried to be drilled using a hand-held tool driving device whose spindle has lower rigidity than that of a machine tool, such as a drilling machine or a machining center, not only a drill itself may be damaged, but also the tool driving device may be broken. In particular, when the tool driving device breaks down, a lot of cost and time are required to repair the tool driving device by replacing a damaged part and the like.

In addition, when an operator uses a hand-held tool driving device to drill a titanium alloy, it is necessary to ensure the safety of the operator. More specifically, it is necessary to take measures to prevent an industrial accident even if a jig for setting a titanium alloy or a tool driving device falls, or a drill is damaged due to drilling of the titanium alloy with large cutting resistance.

On the other hand, it is required to secure the quality of a hole machined in a titanium alloy while ensuring the safety of an operator. As a result, a titanium alloy whose cutting resistance is large is drilled at an extremely slow drilling speed. Therefore, there is a need to develop a drill that not only can ensure the safety of an operator and drilling quality, but also can drill a titanium alloy at a higher speed in view of productivity.

Accordingly, a drill and a drilling method according to embodiments of the present invention can complete drilling in a shorter time while ensuring the safety of an operator and drilling quality in case of drilling a titanium alloy using a hand-held tool driving device.

In general, according to one embodiment, a drill has two to four cutting edges each made of cemented carbide or polycrystalline diamond. Helical flutes are formed alternately with the cutting edges. X-shaped thinning has been applied to the cutting edges. A rake angle of the cutting edges is not less than 30 degrees and not more than 40 degrees. A clearance angle of the cutting edges is more than 0 degrees and not more than 8 degrees. The cutting edges each has a honed face by chamfer honing. A honing angle of the honed face is not less than −3 degrees and not more than 8 degrees.

Further, according to one embodiment, a method of producing a drilled product includes producing the above-mentioned drilled product by drilling a part with the drill. The part is made of a titanium alloy.

Obviously, numerous modifications and variations of the present invention are possible in light of the above teachings. It is therefore to be understood that within the scope of the appended claims, the invention may be practiced otherwise than as specifically described herein.

What is claimed is:

1. A drill, comprising:

a body having two to four cutting edges each comprising at least one of cemented carbide and polycrystalline diamond such that the cutting edges are forming helical flutes alternately, wherein X-shaped thinning has been applied to the cutting edges, the cutting edges has a rake angle in a range of 30 degrees to 40 degrees and a clearance angle of more than 0 degrees and not more than 8 degrees, and each of the cutting edges has a honed face by chamfer honing such that a honing angle of the honed face is in a range of −3 degrees to 8 degrees, the drill is a double margin drill having fluted lands on each of which two margins are formed such that each of the fluted lands is formed between adjacent two of the helical flutes, and a cutting edge length of the drill, defined as a flute length of the helical flutes, is longer than five times a tool diameter of the drill.

2. A method of producing a drilled product, comprising: drilling a part with the drill of claim 1, wherein the part is made of a titanium alloy.

3. The method of claim 2, wherein the drilling the part includes performing vibration cutting in which the drill is reciprocated in a tool axis direction.

4. The method of claim 2, wherein the drilling the part includes setting a rotation speed of the drill in a range of 400 rpm to 700 rpm, setting a feed per tooth of the drill to not less than 0.05 mm, and performing vibration cutting in which the drill is reciprocated in a tool axis direction at least 5 times per round of the drill with an amplitude of not less than 0.20 mm.

5. The drill according to claim 1, wherein each of the cutting edges has a flank face having the clearance angle, and another flank face formed adjacent to the flank face and having a discharge port configured to discharge cutting fluid toward a workpiece.

6. A method of producing a drilled product, comprising:

drilling a part with the drill of claim 5, wherein the part is made of a titanium alloy.

7. The method of claim 6, wherein the drilling the part includes setting a rotation speed of the drill in a range of 400 rpm to 700 rpm, setting a feed per tooth of the drill to not less than 0.05 mm, and performing vibration cutting in which the drill is reciprocated in a tool axis direction at least 5 times per round of the drill with an amplitude of not less than 0.20 mm.

8. The method of claim 6, wherein the drilling the part includes performing vibration cutting in which the drill is reciprocated in a tool axis direction.

9. The drill according to claim 1, wherein each of the cutting edges comprises polycrystalline diamond.

10. The drill according to claim 9, wherein each of the cutting edges has a flank face having the clearance angle, and another flank face formed adjacent to the flank face and having a discharge port configured to discharge cutting fluid toward a workpiece.

11. A method of producing a drilled product, comprising:

drilling a part with the drill of claim 10, wherein the part is made of a titanium alloy.

12. A method of producing a drilled product, comprising:

drilling a part with the drill of claim 9, wherein the part is made of a titanium alloy.

13. The method of claim 12, wherein the drilling the part includes setting a rotation speed of the drill in a range of 400 rpm to 700 rpm, setting a feed per tooth of the drill to not less than 0.05 mm, and performing vibration cutting in which the drill is reciprocated in a tool axis direction at least 5 times per round of the drill with an amplitude of not less than 0.20 mm.

14. The method of claim 12, wherein the drilling the part includes setting a rotation speed of the drill in a range of 400 rpm to 700 rpm, setting a feed per tooth of the drill to not less than 0.05 mm, and performing vibration cutting in which the drill is reciprocated in a tool axis direction at least 5 times per round of the drill with an amplitude of not less than 0.20 mm.

15. The drill according to claim 1, wherein each of the cutting edges comprises cemented carbide.

16. A method of producing a drilled product, comprising:

drilling a part with the drill of claim 15, wherein the part is made of a titanium alloy.

17. The method of claim 16, wherein the drilling the part includes setting a rotation speed of the drill in a range of 400 rpm to 700 rpm, setting a feed per tooth of the drill to not less than 0.05 mm, and performing vibration cutting in which the drill is reciprocated in a tool axis direction at least 5 times per round of the drill with an amplitude of not less than 0.20 mm.

18. The drill according to claim 15, wherein each of the cutting edges has a flank face having the clearance angle, and another flank face formed adjacent to the flank face and having a discharge port configured to discharge cutting fluid toward a workpiece.

19. A method of producing a drilled product, comprising:

drilling a part with the drill of claim 18, wherein the part is made of a titanium alloy.

20. The method of producing the drilled product according to claim 19, wherein the drilling the part includes setting a rotation speed of the drill in a range of 400 rpm to 700 rpm, setting a feed per tooth of the drill to not less than 0.05 mm, and performing vibration cutting in which the drill is reciprocated in a tool axis direction at least 5 times per round of the drill with an amplitude of not less than 0.20 mm.

* * * * *